(12) United States Patent
Berckenhoff

(10) Patent No.: US 8,702,106 B2
(45) Date of Patent: Apr. 22, 2014

(54) PRESSURE ENERGIZED RADIAL SEAL

(75) Inventor: Michael Wayne Berckenhoff, Spring, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 2108 days.

(21) Appl. No.: 11/489,995

(22) Filed: Jul. 20, 2006

(65) Prior Publication Data

US 2008/0017814 A1 Jan. 24, 2008

(51) Int. Cl.
*F16J 15/00* (2006.01)

(52) U.S. Cl.
USPC .......................................... 277/589

(58) Field of Classification Search
USPC .......... 277/438, 564, 569, 584, 589, 611, 638
See application file for complete search history.

(56) References Cited

U.S. PATENT DOCUMENTS

| | | |
|---|---|---|
| 3,525,530 A | 8/1970 | Bauer et al. |
| 3,887,198 A | 6/1975 | McClure et al. |
| 3,970,321 A | 7/1976 | Dechavanne |
| 4,328,972 A | 5/1982 | Albertson et al. |
| 5,123,662 A | 6/1992 | Sugimura et al. |
| 5,165,704 A | 11/1992 | Schaeper et al. |
| 5,171,027 A | 12/1992 | Domkowski et al. |
| 5,385,353 A | 1/1995 | Edlund et al. |
| 5,632,494 A | 5/1997 | Oka et al. |
| 5,655,745 A | 8/1997 | Morrill |
| 5,738,358 A * | 4/1998 | Kalsi et al. ............... 277/544 |
| 5,921,556 A * | 7/1999 | Bauman et al. ........... 277/560 |
| 5,941,534 A | 8/1999 | Terao et al. |
| 6,283,667 B1 * | 9/2001 | Neitzel ..................... 403/158 |
| 6,305,483 B1 * | 10/2001 | Portwood .................. 175/371 |
| 6,554,247 B2 | 4/2003 | Berckenhoff et al. |
| 6,616,146 B2 | 9/2003 | Friend et al. |
| 6,663,144 B1 | 12/2003 | Smith, III |
| 2006/0006608 A1 * | 1/2006 | LaPlante et al. ........... 277/569 |

* cited by examiner

*Primary Examiner* — Gilbert Lee
(74) *Attorney, Agent, or Firm* — Bracewell & Giuliani LLP

(57) ABSTRACT

A seal assembly disposed within a radial seal groove to sealingly engage a bonnet within a bore. The seal assembly includes a radial seal surface, an axial seal surface, a vent surface, and an axial preload surface. The seal assembly is thrust towards a longitudinal wall and away from a radial wall of the radial seal groove when pressure in a high-pressure zone increases.

8 Claims, 9 Drawing Sheets

PRESSURE ENERGIZED RADIAL SEAL

BACKGROUND OF INVENTION

1. Field of the Invention

Embodiments disclosed herein generally relate to blowout preventers used in the oil and gas industry. Specifically, embodiments selected relate to blowout preventers with a novel seal assembly to seal between high-pressure and low-pressure zones.

2. Background Art

Well control is an important aspect of oil and gas exploration. When drilling a well, for example, safety devices must be put in place to prevent injury to personnel and damage to equipment resulting from unexpected events associated with the drilling activities.

Drilling wells involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with a kick is generally produced by an influx of formation fluids (which may be a liquid, a gas, or a combination thereof) into the wellbore. The relatively high-pressure kick tends to propagate from a point of entry in the wellbore uphole (from a high-pressure region to a low-pressure region). If the kick is allowed to reach the surface, drilling fluid, well tools, and other drilling structures may be blown out of the wellbore. Such "blowouts" may result in catastrophic destruction of the drilling equipment (including, for example, the drilling rig) and substantial injury or death of rig personnel.

Because of the risk of blowouts, devices known as blowout preventers ("BOPs") are installed above the wellhead at the surface or on the sea floor in deep water drilling arrangements to effectively seal a wellbore until active measures can be taken to control the kick. BOPs may be activated so that kicks are adequately controlled and "circulated out" of the system. There are several types of BOPs, the most common of which are annular blowout preventers and ram-type blowout preventers. From this point further, ram-type blowout preventers will be discussed in more detail.

Referring to FIG. 1, an example of a ram-type BOP 100 is shown. Ram-type BOP 100 typically includes a body 102 and at least two oppositely disposed bonnets 104. Bonnets 104 may be secured to body 102 with, for example, bolts and/or a hinge so that bonnet 104 may be removed for maintenance. Alternatively, as shown in FIG. 1, bonnets 104 may be secured to body 102 using radial lock mechanism 106 to enable bonnets 104 to slide and rotate when necessary for maintenance.

Engaged within each bonnet 104 is a piston actuated ram 108. Typically, rams 108 are either pipe or variable bore rams which, when activated, move to engage and surround drillpipe and/or well tools to seal the wellbore, shear rams which, when activated, move to engage and physically shear any drillpipe and/or well tools in the wellbore, or blind rams which, when activated, move to engage and close the wellbore when no drillpipe is present. Rams 108 may be located opposite of each other along an axis 112 and may seal against one another proximate a center of a wellbore 110. More discussion of ram-type blowout preventers and high-pressure seals is provided in U.S. Pat. No. 6,554,247 ("the '247 patent"), issued to Berckenhoff, assigned to the assignee of the present invention, and incorporated herein by reference in its entirety.

As with any tool used in drilling oil and gas wells, blowout preventers must be sealed and secured to prevent potential hazard to the surrounding environment and personnel. For example, ram-type BOPs may include high-pressure seals between the bonnets and the body of the BOP to prevent leakage of fluids. In many instances, the high-pressure seals are elastomeric seals and should be checked regularly to ensure that the elastomeric components have not been cut, permanently deformed, or deteriorated by, for example, a chemical reaction with the drilling fluid in the wellbore.

Referring now to FIG. 2 (taken from the '247 patent), an example of a ram-type BOP 200 includes a high-pressure face seal carrier 202 to seal between a bonnet 104 and a body 102. Face seal carrier 202 is disposed in a groove 204 formed in bonnet 104 about axis 112. Face seal carrier 202 includes two elastomeric o-ring seals 206, 208 and a biasing mechanism 210. O-ring seals 206, 208 sealingly engage surfaces of body 102 and bonnet 104, while biasing mechanism 210 biases face seal carrier 202 from bonnet 104 towards body 102. One concern with a seal of this type is that in a BOP, the bonnet and the body of the BOP may need to be larger to accommodate a face seal. For example, face seal carrier 202 is retained within a face surface 212 of bonnet 104 to seal against body 102. This requires bonnet 104 (and corresponding body 102) to be radially larger to retain face seal assembly 104 than may be necessary for a radial seal. Furthermore, face seals may be more susceptible to a loss of seal integrity. For example, when sealing across imperfections and defects (e.g., scratches, gouges, abrasions) in seal surfaces, face seals may be more susceptible to have leak across the seal.

Referring now to FIG. 3A, an example of a radial seal 302 is shown schematically. FIG. 3A is taken from U.S. Pat. No. 3,887,198 (issued to McClure et al. and incorporated herein by reference in its entirety). As shown, radial seal 302 is disposed in a groove 306 of a shaft 304 and seals between shaft 304 and body 308. A fluid F enters through a clearance 310 between shaft 304 and body 308 into groove 306. Fluid F enters under high pressure and thrusts radial seal 302 to sealingly engage with another clearance 312 between shaft 304 and body 308. Similarly, in another schematic example shown in FIG. 3B, a radial seal 302 may further include a ring 314 to ensure proper spacing of radial seal 302 between body 308 and shaft 304. FIG. 3B is taken from U.S. Pat. No. 3,970,321 (issued to Dechavanne and incorporated herein by reference in its entirety). A concern with these types of sealing assemblies, though, may relate to the inability to seal at low pressures. For example, under low pressure, radial seal 302 may not have enough fluid F to pressurize and thrust radial seal 302 into sealing engagement with clearance 312.

Referring now to FIG. 4, another example of a ram-type BOP 400 including a radial seal 408 is shown. Radial seal 408 is disposed in a groove 406 formed in a bonnet 404 about axis 112. Retainer 407 is used to retain radial seal 408 within groove 406. Radial seal 408 seals between bonnet 404 and a body 402. As shown, radial seal 408 includes multiple rings 410 that may provide structural support for radial seal 408. A concern with radial seals is that under high pressure, body 402 may expand about axis 112, while bonnet 404 remains relatively dimensionally stable. In such a condition, radial seal 408 may not be able to effectively seal between body 402 and bonnet 404.

Accordingly, there exists a need for a sealing assembly to seal between surfaces under high pressure without sacrificing sealing capabilities under low pressure.

SUMMARY OF INVENTION

In one aspect, embodiments disclosed herein relate to an apparatus to isolate a high-pressure zone from a low-pressure zone. The apparatus comprises a bonnet engaged within a bore along an axis, a radial seal groove located in one of the bonnet and the bore wherein the radial seal groove comprises a radial wall and a longitudinal wall, and a seal assembly disposed in the radial groove. The seal assembly comprises a radial seal surface, an axial seal surface, a vent surface, an axial preload surface, and a backup ring adjacent to the longitudinal wall and at least partially bonded to the seal assembly. At least a portion of the vent surface and the radial seal surface are radially preloaded, and at least a portion of the axial preload surface and the axial seal surface are axially preloaded.

In another aspect, embodiments disclosed herein relate to a seal assembly disposed within a radial seal groove to sealingly engage a bonnet within a bore. The seal assembly comprises a radial seal surface, an axial seal surface, a vent surface, an axial preload surface, a backup ring at least partially bonded adjacent to the axial seal surface, and at least one vent to allow communication between a high-pressure zone and the vent surface. The radial seal surface sealingly engages against the bore and the axial seal surface sealingly engages against a longitudinal wall of the radial seal groove. Further, the seal assembly is thrust towards the longitudinal wall and away from a radial wall of the radial seal groove when pressure in a high-pressure zone increases.

In another aspect, embodiments disclosed herein relate to a seal assembly disposed within a radial seal groove to sealingly engage a bonnet within a bore. The seal assembly comprises a seal carrier, a radial seal surface, an axial seal surface, a vent surface, an axial preload surface, a sealing element disposed on the radial seal surface, and a sealing element disposed on the axial seal surface. The sealing element disposed on the radial seal surface sealingly engages against the bore and the sealing element disposed on the axial seal surface sealingly engages against a longitudinal wall of the radial seal groove. Further, the seal assembly is thrust towards the longitudinal wall and away from a radial wall of the radial seal groove when pressure in a high-pressure zone increases.

Other aspects and advantages of the invention will be apparent from the following description and the appended claims.

DETAILED DESCRIPTION

In one aspect, embodiments disclosed herein provide for an apparatus to seal between high-pressure and low-pressure zones. In another aspect, embodiments disclosed herein provide for an apparatus to seal between a bonnet and a bore of a ram-type blowout preventer. Further, in another aspect, embodiments disclosed herein provide a sealing apparatus to seal between a bonnet and a bore of a ram-type blowout preventer under both high pressure and low pressure.

Figure 1:
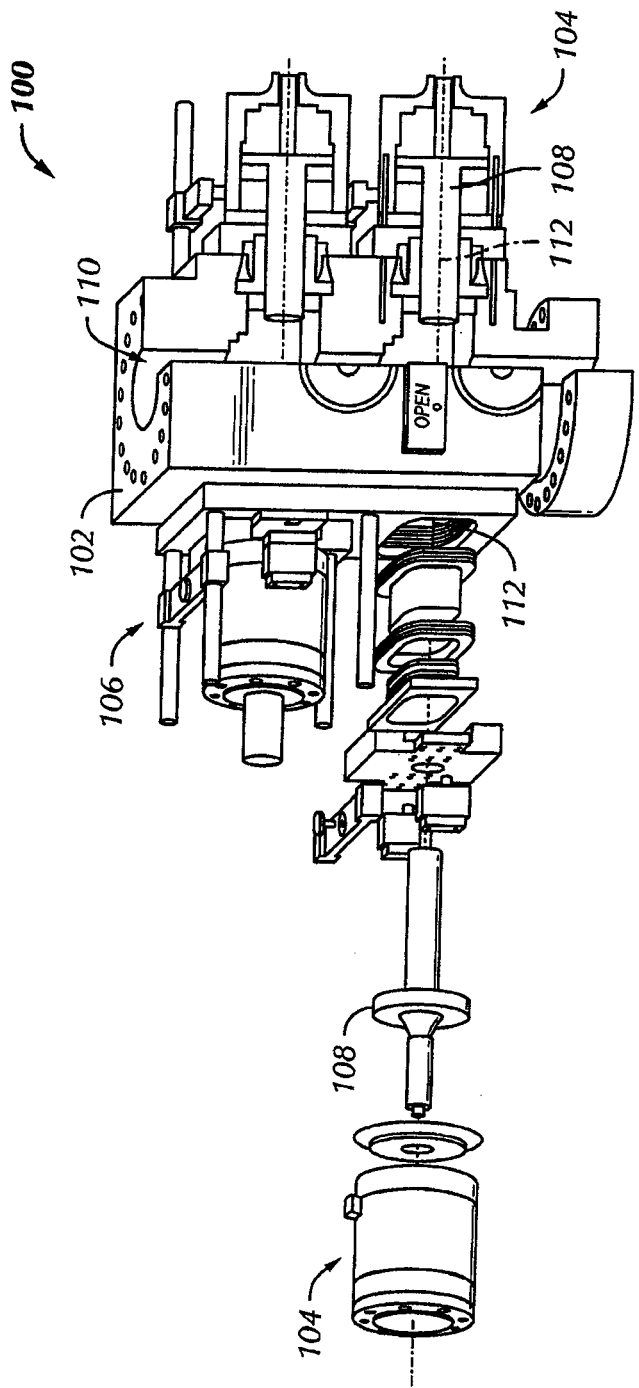
FIG. 1 is a perspective view of a prior art ram-type blowout preventer.
Figure 2:
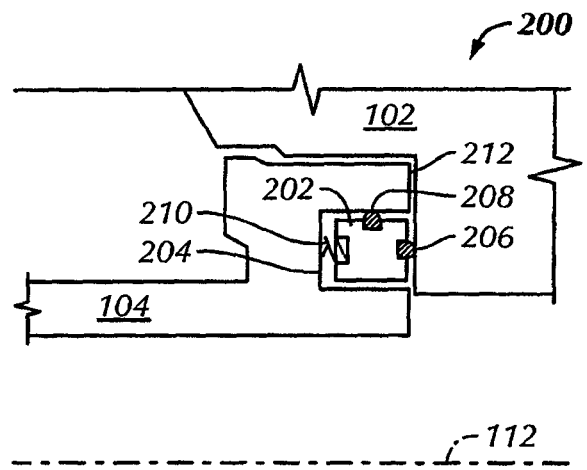
FIG. 2 is a cross-sectional view of a prior art high-pressure seal carrier disposed between a bonnet and a BOP body of a ram-type blowout preventer.
Figure 3A:
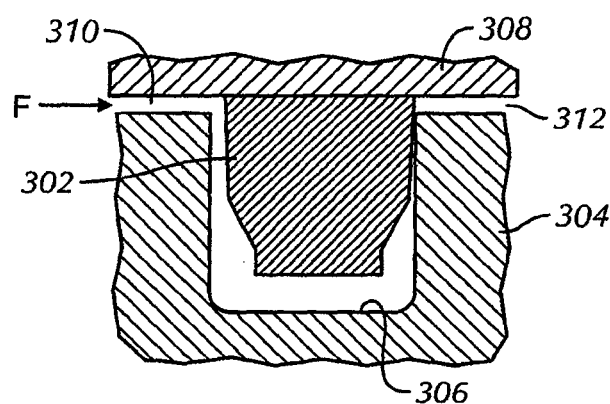
FIG. 3A is a cross-sectional view of a prior art high-pressure seal disposed in a groove about a shaft.
Figure 3B:
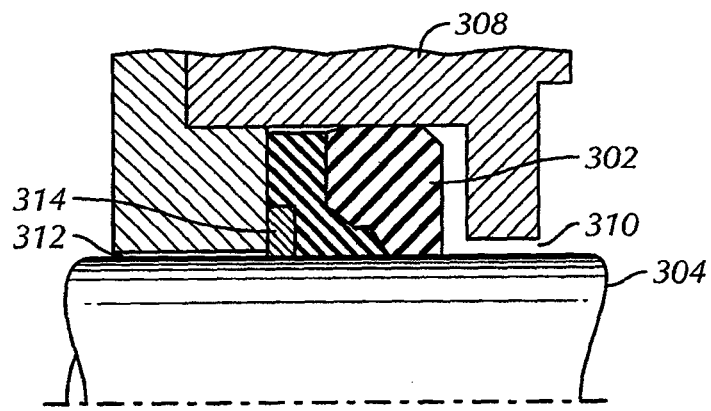
FIG. 3B is a cross-sectional view of prior art high-pressure seal with a ring to seal about a shaft.
Figure 4:
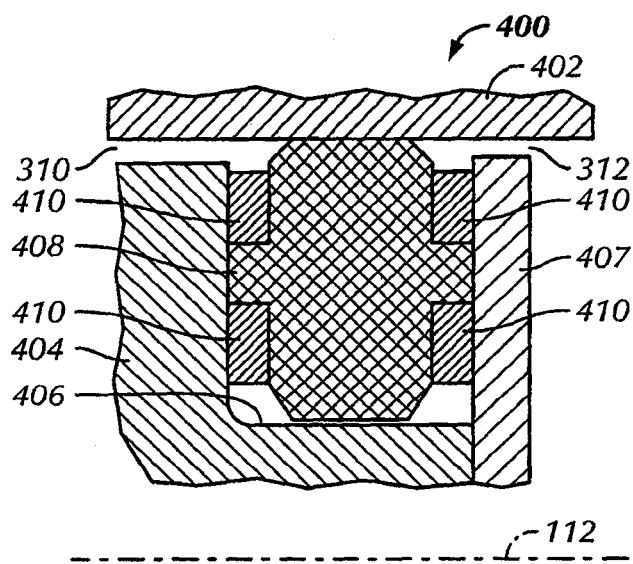
FIG. 4 is a cross-sectional view of a prior art seal disposed between a bonnet and a BOP body of a ram-type blowout preventer.
Figure 5A:
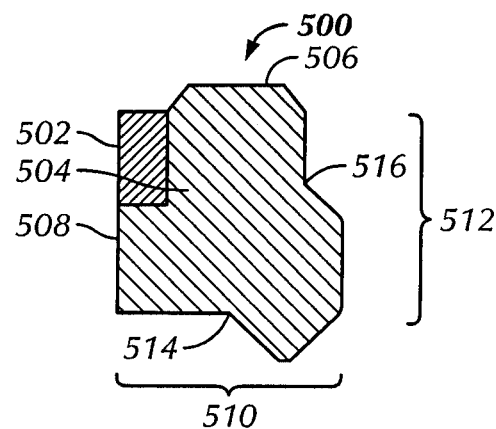
FIG. 5A is a cross-sectional view of a seal assembly in accordance with an embodiment of the present disclosure.
Figure 5B:
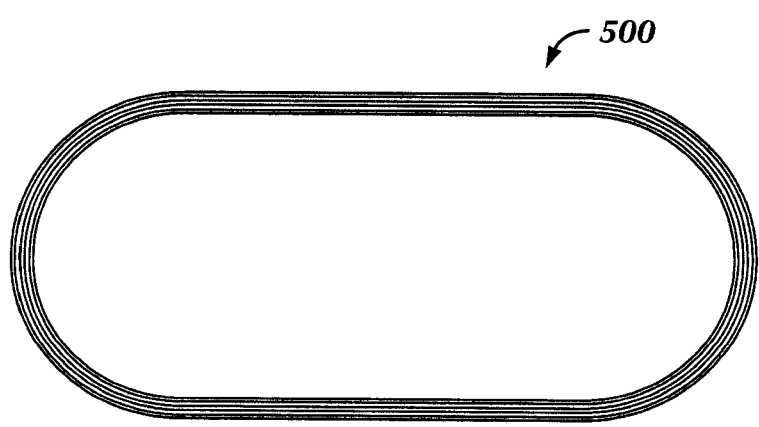
FIG. 5B is a perspective view of a seal assembly in accordance with an embodiment of the present disclosure.

Referring now to FIGS. 5A and 5B, a seal assembly 500 in accordance with an embodiment of the present disclosure is shown. FIG. 5A shows a cross section of the entire seal assembly 500 shown in FIG. 5B. In FIG. 5B, seal assembly is depicted as having an oval shape, as may be used about a bonnet of a ram-type blowout preventer, but those having ordinary skill in the art will appreciate that the present invention is not limited to any particular shape. For example, in another embodiment, the seal assembly may be of a circular shape.

As such, seal assembly 500 includes a seal body 504 with a backup ring 502 at least partially bonded thereto. In one embodiment, only a portion of backup ring 502 may be bonded to seal assembly 500. Alternatively, in another embodiment, all of backup ring 502 may be bonded to seal assembly 500. Regardless, backup ring 502 may be bonded to seal assembly 500 by any means known in the art, including, but not limited to, by adhesion or vulcanization. Seal assembly 500 further includes a radial seal surface 506, an axial seal surface 508, a vent surface 510, and an axial preload surface 512. In one embodiment, vent surface 510 may include a vent surface relief groove 514. In another embodiment, axial preload surface 512 may include an axial preload surface relief groove 516. Further, seal assembly 500 may comprise any viscoelastic material known in the art (e.g., rubber, elastomers). Furthermore, backup ring 502 may comprise any metallic material known in the art (e.g., steel, titanium), in addition to any thermoplastic or thermoset resin and material reinforcement known in the art (e.g., epoxy with carbon fiber or fiber glass).

Figure 6:
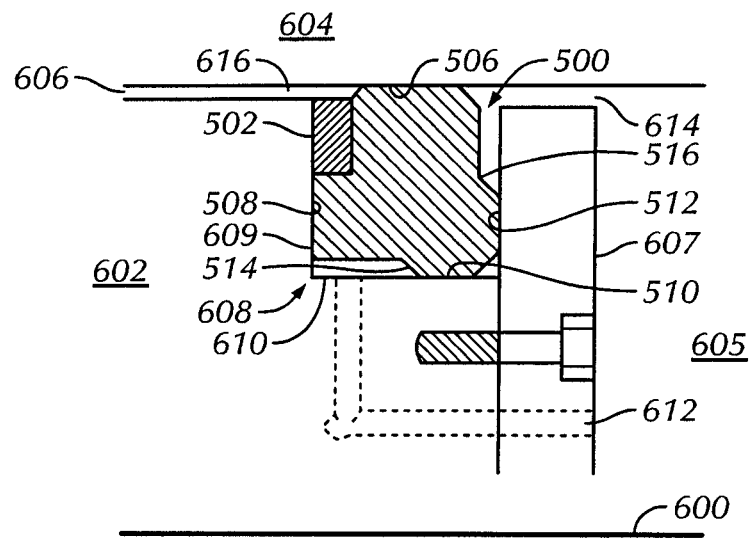
FIG. 6 is a cross-sectional view of a seal assembly disposed in a radial seal groove in accordance with an embodiment of the present disclosure.

Referring now to FIG. 6, a cross-sectional of seal assembly 500 disposed between a bore 604 and a bonnet 602 in accordance with an embodiment of the present disclosure is shown. As shown, bonnet 602 engages bore 604 about an axis 600 such that seal assembly 500 sealingly engages bore 604 to isolate a high-pressure zone 605 from a low-pressure zone 606. While embodiments of the present disclosure are described herein in terms of their applicability to a BOP apparatus, those having ordinary skill in the art will appreciate that the present invention may be used in any pressure seal application. As such, the terms "bonnet" and "bore" are used generically and should not be limited to a blowout preventer application. Therefore, the term "bonnet" may be used to describe a male member and the term "bore" may be used to describe a female member in a male-to-female seal application.

As shown, seal assembly 500 is disposed in a rabbeted radial seal groove 608 of bonnet 602. Radial seal groove 608 includes a longitudinal wall 609 and a radial wall 610. As used herein, the term "groove" is used generically to define any channel, rabbet, step, or offset that may allow the seal assembly to be disposed within. In one embodiment, seal assembly 500 may be retained within radial seal groove 608 by a seal retainer 607. Seal retainer 607 may be removably secured to bonnet 602 by, for example, a bolt, as shown in FIG. 6. In another embodiment, a high-pressure vent 612 may be used to allow fluid to communicate and between high-pressure zone 605 and vent surface 510 of seal assembly 500. Further, high-pressure vent 612 may supply high-pressure fluid to vent surface relief groove 514 (if present) of seal assembly 500. In another embodiment, a high-pressure clearance 614 and a low-pressure clearance 616 may be isolated by seal assembly 500. High-pressure clearance 614 may supply the high-pressure fluid from high-pressure zone 605 to axial preload surface relief groove 516 (if present) of seal assembly 500. As shown in FIG. 6, axial seal surface 508 of seal assembly 500 sealingly engages against longitudinal wall 609 of radial seal groove 608. Similarly, radial seal surface 506 of seal assembly 500 sealingly engages against a surface of BOP bore 604.

Figure 7:
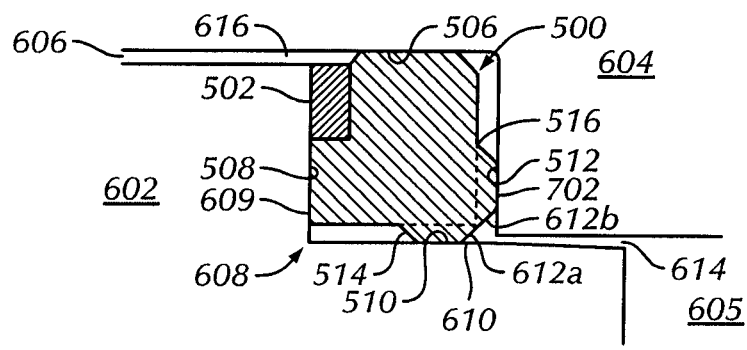
FIG. 7 is a cross-sectional view of a seal assembly disposed in a radial seal groove in accordance with an embodiment of the present disclosure.

Referring now to FIG. 7, a cross-sectional view of seal assembly 500 disposed between bonnet 602 and BOP bore 604 in accordance with an embodiment of the present disclosure is shown. As shown, seal assembly 500 is disposed within a radial seal groove 608 of bonnet 602. However, those having ordinary skill in the art will appreciate that embodiments of the present invention are not limited to the radial seal groove disposed within the bonnet. Alternatively, the seal assembly may be disposed within a radial seal groove of the BOP bore. Regardless, as shown in FIG. 7, in place of a seal retainer (e.g., 607 of FIG. 6), a ledge 702 of BOP bore 604 may be used to retain seal assembly 500 between bonnet 602 and BOP bore 604. Thus, those having ordinary skill in the art will appreciate that embodiments of the present invention are not limited to the use of a seal retainer to retain the seal assembly between the bonnet and the BOP bore.

As shown, a high-pressure clearance 614 may allow fluid from high-pressure zone 605 to communicate with vent surface relief groove 514 and axial preload surface relief groove 516 of seal assembly 500. Specifically, vent surface 510 may comprise a high-pressure vent 612A to allow fluid from high-pressure zone 605 communicate with relief groove 514 through high-pressure clearance 614, and preload surface 512 may comprise a high-pressure vent 612B to allow fluid from high-pressure zone 605 communicate with relief groove 514 through high-pressure clearance 614. Thus, those having ordinary skill in the art will appreciate that embodiments of the present disclosure may have the high-pressure vent disposed within the bonnet (as shown in FIG. 6) or bore of the BOP, or may have the high-pressure vent disposed within the seal assembly itself (as shown in FIG. 7). Further, those having ordinary skill in the art will appreciate that the present invention is not limited to a number of pressure vents, as also indicated with FIG. 7.

Figure 8:
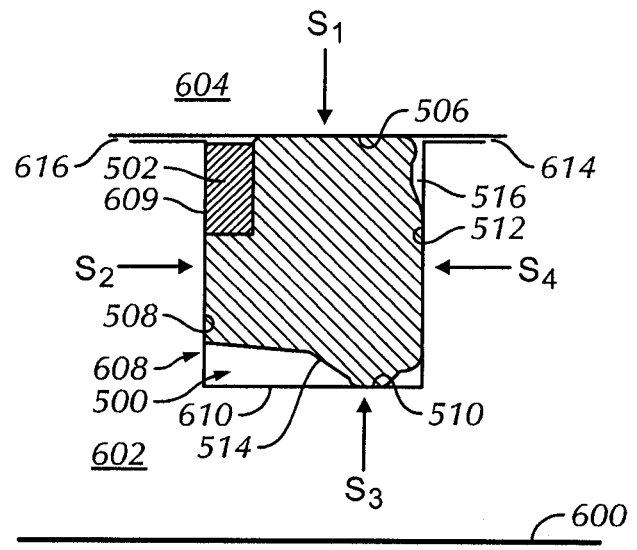
FIG. 8 is a cross-sectional view of a seal assembly disposed in a radial seal groove under low-pressure in accordance with an embodiment of the present disclosure.

Referring now to FIG. 8, a cross-sectional view of seal assembly 500 in a preloaded state between bonnet 602 and BOP bore 604 in accordance with an embodiment of the present disclosure is shown. Specifically, as shown, seal assembly 500, bonnet 602, and BOP bore 604 are exposed to relatively low operating pressure such that high-pressure clearance 614 and low-pressure clearance 616 may be small or completely closed. Under low operating pressures, seal assembly 500 is capable of containing the fluids from high-pressure zone 605 without radial expansion of BOP body about axis 600. Under such low operating pressures, seal assembly 500 sealingly engages between bonnet 602 and BOP bore 604, thus isolating high-pressure zone 605 from low-pressure zone 606. Thus, seal assembly 500 is in a preload state such that seal assembly 500 is elastically deformed within radial seal groove 608. Specifically, when elastically deformed in the preload state, seal assembly 500 has forces $S_1$-$S_4$ acting upon surfaces 506, 508, 510, and 512 of seal assembly 500. Radial seal surface 506 has a preload force $S_1$ exerted by the surface of BOP bore 604 in the direction of vent surface 510. Axial seal surface 508 has a preload force $S_2$ exerted by longitudinal wall 609 in the direction of preload surface 512. Vent surface 510 has a preload force $S_3$ exerted by radial wall 610 of radial seal groove 608 in the direction radial seal surface 506. Additionally, axial preload surface 512 has a preload force $S_4$ exerted by seal retainer 607 in the direction of axial seal surface 508.

When elastically deformed in a preloaded state at low operating pressure, relief grooves 514, 516 (if present) may provide relief for seal assembly 500. Because seal assembly 500 may be volumetrically restricted when contained within radial seal groove 608 under low operating pressures, relief grooves 514, 516 may provide regions of excess volume, thus allowing the material of seal assembly 500 to flow when elastically deformed.

Further, in some embodiments, backup ring 502 of seal assembly 500 may provide structural support for seal assembly 500. For example, as shown in FIG. 8, seal assembly 500 may elastically deform under low operating pressure when restricted within radial seal groove 608. To prevent the material of seal assembly 500 from displacing into low-pressure clearance 616, backup ring 502 may be positioned adjacent to longitudinal wall 609 to support the body of seal assembly 500. Preferably, backup ring 502 may be comprised of a lower modulus of elasticity material than bore 604 of BOP body. Additionally, as shown, backup ring 502 has an aspect ratio of about 2:1 to maximize rigidity and bonding area while minimizing size. However, those having ordinary skill in the art will appreciate that the embodiments of the present invention are not limited to a particular size, shape, or configuration of the backup ring. For example, in another embodiment, the backup ring may be segmented, such that the seal assembly has the backup ring along selected portions of the seal assembly instead of a continuous ring around the entirety of the seal assembly. In such an embodiment, selected portions of the backup ring may be alternated with portions of an elastomer to enable the backup ring to radially expand and compress as necessary. The portions of the backup ring and the portions of the elastomer may interlock or bond with one another. This may allow for a more economical seal assembly to be manufactured, with elastomer substituted for metal for selected portions of the backup ring. Further, in another embodiment, the backup ring may be a rolled spring so that it may also radially expand and compress as necessary.

Figure 9:
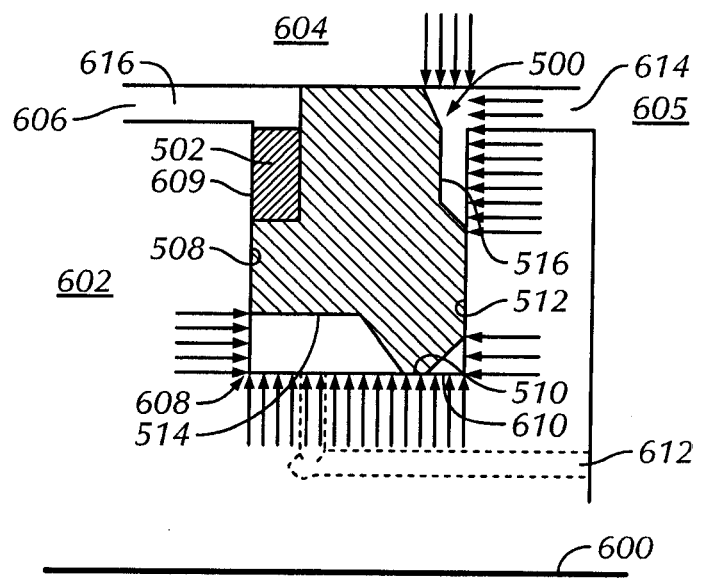
FIG. 9 is a cross-sectional view of a seal assembly disposed in a radial seal groove under high-pressure in accordance with an embodiment of the present disclosure.

Referring now to FIG. 9, a cross-sectional view of seal assembly 500 disposed between bonnet 602 and BOP bore 604 in accordance with an embodiment of the present disclosure is shown. In FIG. 9, seal assembly 500, bonnet 602, and bore 604 of BOP body are exposed to relatively high operating pressure. As a result of the elevated operating pressure, BOP body expands or swells in size about axis 600 such that bore 604 may enlarge in size. For example, in a 15,000 psi (103,400 kPa) rated BOP body experiencing pressures in excess of 20,000 psi (137,900 kPa) for pressure testing as required for by the American Petroleum Institute, the BOP bore and body have been observed radially expanding over 0.080 in (0.203 cm). As BOP bore 604 increases in size, high-pressure clearance 614 and low-pressure clearance 616 may increase in size compared to those shown in FIG. 8. Similarly, the effective volume of radial seal groove 608 may increase in size compared to that shown in FIG. 8.

In FIG. 9, fluids from the high-pressure zone 605 are able to enter radial seal groove 608. Specifically, fluids enter through high-pressure clearance 614 to act upon relief groove 516 of axial preload surface 512 and enter through high-pressure vent 612 to act upon relief groove 514 of vent surface 510. The pressures of fluids acting upon surfaces 512, 514 result in a pressure resultant force P acting upon seal assembly 500 that thrusts seal assembly 500 toward radial seal surface 506 and axial seal surface 508. Furthermore, as bore 604 of BOP body increases in size, seal assembly 500 may no longer be in a preloaded state. Thus, when in a low operating pressure configuration as shown in FIG. 8, seal assembly 500 may be elastically preloaded by the volume restriction within the radial seal groove, the bonnet, and the BOP bore to sealingly isolate the high-pressure and low-pressure zones. In contrast, under relatively high operating pressure, fluids from the high-pressure zone act upon seal assembly 500 to sealingly engage the bonnet and the BOP bore.

Figure 10:
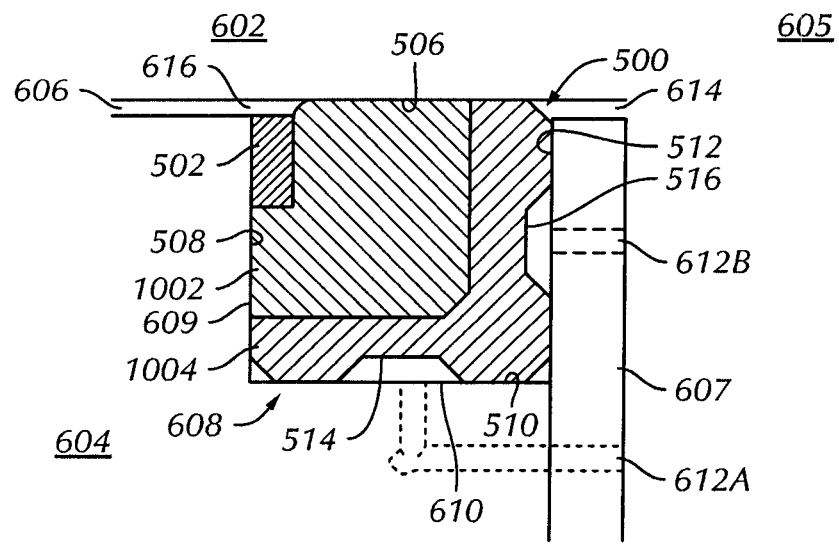
FIG. 10 is a cross-sectional view of a seal assembly disposed in a radial seal groove in accordance with an embodiment of the present disclosure.

Referring now to FIG. 10, a seal assembly 500 in accordance with an embodiment of the present disclosure is shown. As shown, seal assembly 500 comprises multiple compounds. The multiple compounds may include a low-durometer compound 1002 and a high-durometer compound 1004. Low-durometer compound 1002 may include radial seal surface 506 and axial seal surface 508. Furthermore, high-durometer compound 1004 may include vent surface 510, axial preload surface 512, and relief grooves 514, 516. Thus, low-durometer compound 1002 may sealingly engage the surface of BOP bore 604 and longitudinal wall 609 of radial seal groove 608, while high-durometer compound 1004 may sealingly engage the surface of seal retainer 607 and radial wall 610 of radial seal groove 608. It should be understood that those having ordinary skill in the art will appreciate that the present invention is not limited to a specific configuration or number of the multiple compounds for the seal assembly. For example, in another embodiment, the seal groove may include three or more differing compounds with the highest durometer compound including the vent surface and the axial preload surface, a medium durometer compound including the radial seal surface, and the lowest durometer compound including the axial seal surface. Further, as shown in FIG. 10, two pressure vents 612A, 612B are used to vent fluids from high-pressure zone 605 to seal assembly 500, a first pressure vent 612A in communication with relief groove 514, and a second pressure vent 612B in communication with relief groove 516.

Figure 11:
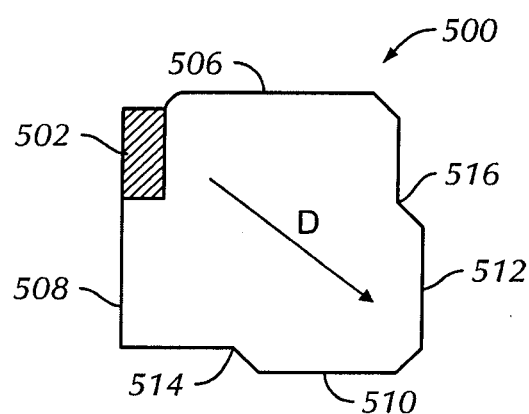
FIG. 11 is a cross-sectional view of a seal assembly in accordance with an embodiment of the present disclosure.

Referring now to FIG. 11, a cross-sectional view of a seal assembly 500 in accordance with an embodiment of the present disclosure is shown. Specifically, seal assembly 500 is comprised of a single multi-durometer compound, wherein the durometer of seal assembly 500 increases in the direction D. Thus, the durometer of seal assembly 500 increases from radial seal surface 506 to vent surface 510 and from axial seal surface 508 to axial preload surface 512. However, those having ordinary skill in the art will appreciate that the present invention is not limited to any particular multi-durometer compound or any particular durometer gradient.

Figure 12:
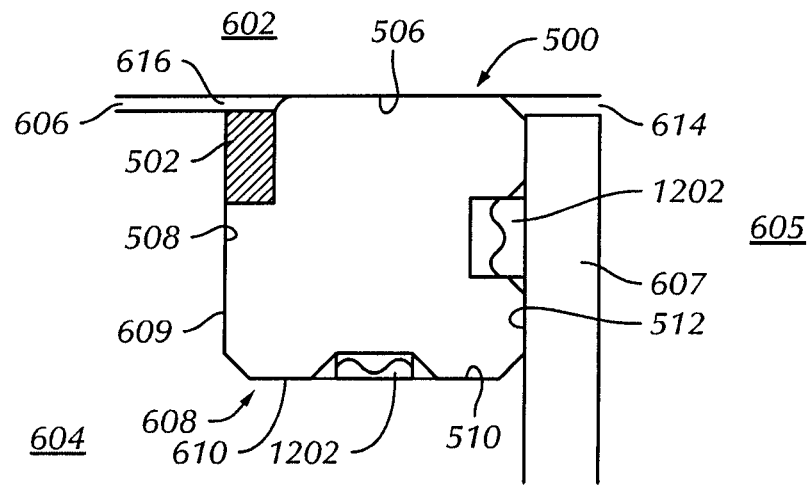
FIG. 12 is a cross-sectional view of a seal assembly disposed in a radial seal groove in accordance with an embodiment of the present disclosure.

Referring now to FIG. 12, a cross-sectional view of a seal assembly 500 having biasing mechanisms 1202 in accordance with an embodiment of the present disclosure is shown. As shown, biasing mechanisms 1202 are disposed upon vent surface 510 and axial preload surface 512. Thus, biasing mechanisms 1202 thrust seal assembly 500 towards longitudinal wall 609 and away from radial wall 610 of radial seal groove 608. Those having ordinary skill in the art will appreciate that the biasing mechanisms may be of any known in the art (e.g., springs or elastomers). As such, the spring constant or durometer of biasing mechanisms 1202 may be selected to result in a preferred amount of preload for seal assembly 500.

Figure 13:
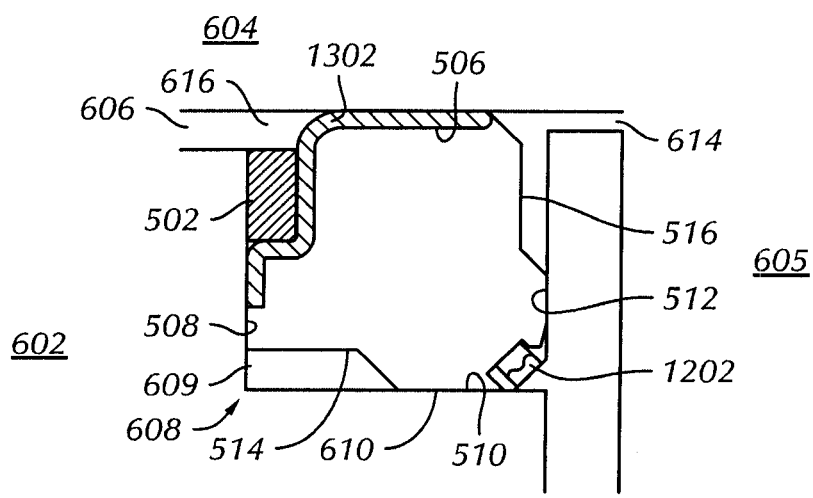
FIG. 13 is a cross-sectional view of a seal assembly disposed in a radial seal groove in accordance with an embodiment of the present disclosure.

Referring now to FIG. 13, a cross-sectional view of seal assembly 500 having a fabric reinforcement 1302 in accordance with an embodiment of the present disclosure is shown. As shown, fabric reinforcement 1302 extends from radial seal surface 506 to axial seal surface 508 of seal assembly 500. Thus, in this embodiment, backup ring 502 is at least partially bonded to fabric reinforcement 1302 of seal assembly 500. The fabric reinforcement may be used to reinforce the seal assembly when sealing between the high-pressure zone and the low-pressure zone. The fabric reinforcement material may also be comprised of any fabric material known in the art, such as KEVLAR®, available from DuPont. Further, as shown in FIG. 13, seal assembly 500 may also include a biasing mechanism 1202 located at the intersection of vent surface 510 and axial preload surface 512. Similar to the embodiment shown in FIG. 12, biasing mechanism 1202 thrusts seal assembly 500 toward longitudinal wall 609 and away from radial wall 610 of radial seal groove 608. Those having ordinary skill in that art will appreciate that the present invention is not limited to any particular configuration for biasing mechanisms 1202 or fabric reinforcement 1302.

Figure 14:
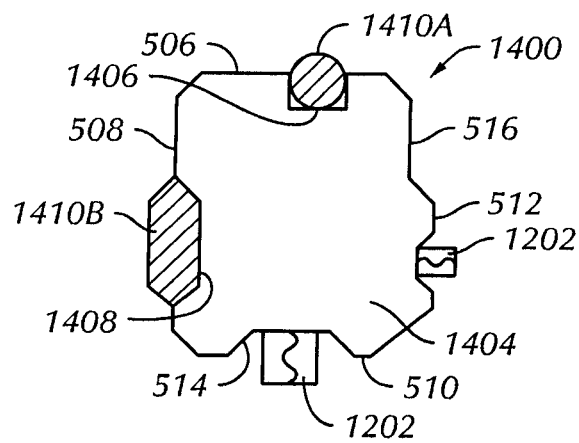
FIG. 14 is a cross-sectional view of a seal assembly in accordance with an embodiment of the present disclosure.

Referring now to FIG. 14, a seal assembly 1400 including a seal carrier 1404 and a plurality of sealing elements 1410A, 1410B in accordance with an embodiment of the present disclosure is shown. Specifically, a sealing element 1410A is disposed in a radial seal surface groove 1406 of seal assembly 1400 and a sealing element 1410B is disposed in axial seal surface groove 1408 of seal assembly 1400. Sealing elements 1410A, 1410B may be of any known in the art, such as o-rings or molded rubber. As shown in FIG. 14, sealing element 1410A is an o-ring and sealing element 1410B is molded rubber. Seal carrier 1404 may then be comprised of any material known in the art. Preferably, seal carrier 1404 may be comprised of a lower modulus of elasticity material than the bonnet or the BOP bore of the BOP body. For example, seal carrier 1404 may be comprised of titanium when the BOP bore is comprised of steel. Further, seal assembly 1400 may include biasing mechanisms 1202.

In one embodiment, under low operating pressures, biasing mechanisms 1202 may be used to have sealing elements 1410A, 1410B sealingly engage BOP bore 604 and bonnet 602. Under high operating pressures, in which BOP bore 604 radially expands, fluid from high-pressure zone may thrust seal carrier 1404 of seal assembly 500 towards radial seal surface 506 and axial seal surface 508. In both circumstances, sealing elements 1410A, 1410B of seal carrier 1404 may be used to sealingly engage BOP bore 604 and bonnet 602 to isolate high-pressure and low-pressure zones.

Figure 15:
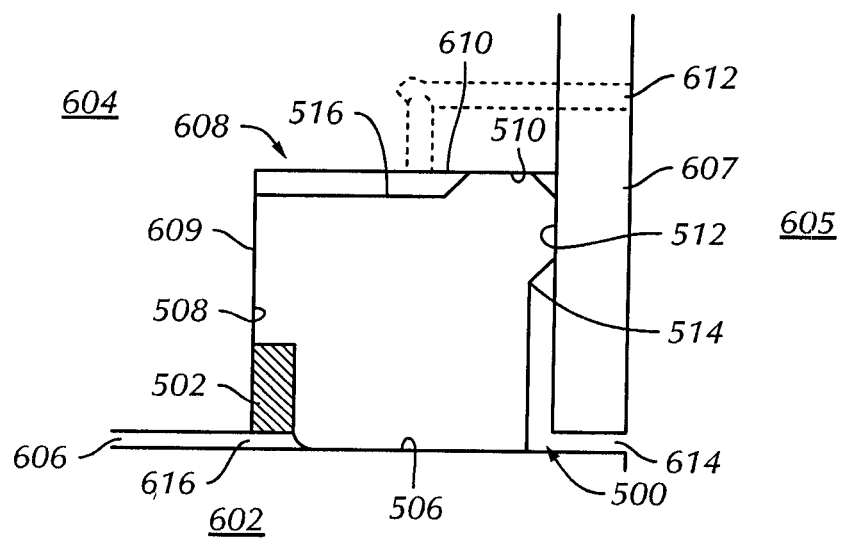
FIG. 15 is a cross-sectional view of a seal assembly disposed in a radial seal groove in accordance with an embodiment of the present disclosure.

As discussed above, those having ordinary skill in the art will appreciate that in an embodiment of the present disclosure, the radial seal groove may be disposed in either the BOP bore or the bonnet. For example, as shown in FIG. 15, radial seal groove 608 having longitudinal wall 609 and radial wall 610 is disposed in BOP bore 604. Under high operating pressures, fluids from high-pressure zone 605 are communicated with relief groove 514 of seal assembly 500 through high-pressure vent 612. Further, fluids from high-pressure zone 605 may be supplied to axial preload surface relief groove 516 through high-pressure clearance 614. Thus, with the elevated pressures acting upon seal assembly 500, seal assembly 500 is thrust towards longitudinal wall 609 and away from radial wall 610 of radial seal groove 608.

Those having ordinary skill in the art will appreciate that the present invention is not limited to use within the oilfield industry, but may be used in any field where radial sealing of an expanding surface is necessary. Additionally, though embodiments of the present disclosure have thus far shown the seal assembly to be a static seal in which the bonnet has remained substantially stationary relative to the BOP bore, seal assemblies in accordance with an embodiment of the present disclosure may also be used in dynamic seal applications. For example, a circular bonnet may rotate about an axis, in a matter similar to a shaft rotating about an axis, with respect to a bore. Alternatively, a bonnet may reciprocate along an axis, similar to a piston reciprocating along an axis, with respect to a bore. In such embodiments, a seal assembly in accordance with an embodiment of the present disclosure may be used to dynamically seal engage the bonnet with the bore. However, in such applications, the bonnet preferably rotates at a low angular velocity or reciprocates with a low frequency relative to the bore to maximize the life of the seal assembly.

Additionally, those having ordinary skill in the art will appreciate that embodiments of the present disclosure may be used to repeatably provide sealing engagement between the BOP body and the bonnet. Because the seal assembly may only elastically deform when restricted within the radial seal groove, the seal assembly may avoid permanent deformation. Thus, the seal assembly may be used to repeatably provide a sealing engagement under many cycles of low operating pressure and high operating pressure without risking integrity of the seal assembly.

Further, those having ordinary skill in the art will appreciate that embodiments of the present disclosure may be used in conjunction with other seals. For example, an embodiment of the present disclosure may be used with a face seal or other radial seals. As such, the invention is not limited to the use seal assemblies disclosed herein.

Advantageously, embodiments disclosed herein may provide for a seal assembly to effectively seal between a BOP body and a bonnet at low operating pressure. Further, embodiments disclosed herein may provide for a seal assembly that may effectively seal between a BOP body and a bonnet at high operating pressures, particularly if the BOP body has the tendency to expand under such pressures. Furthermore, embodiments disclosed herein may provide for a seal assembly to effectively seal between a BOP body and a bonnet at both low and high operating pressures in which one of the BOP body and the bonnet rotates with respect to the other.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A seal assembly disposed within a radial seal groove to sealingly engage a bonnet within a bore, the seal assembly comprising:
   a radial seal surface;
   an axial seal surface;
   a vent surface opposite to the radial seal surface, the vent surface having a first recessed area and a first raised area;
   an axial preload surface having a second recessed area and a second raised area, the axial preload surface being opposite to the axial seal surface; and
   a backup ring at least partially bonded adjacent to the axial seal surface,
   wherein at least one vent of the bonnet is configured to allow communication between a high-pressure zone and the first recessed area but not the first raised area of the vent surface,
   wherein the radial seal surface sealingly engages against the bore and the axial seal surface sealingly engages against a longitudinal wall of the radial seal groove,
   wherein the seal assembly is thrust towards the longitudinal wall and away from a radial wall of the radial seal groove when pressure in the high-pressure zone increases, and
   wherein the first raised area is adjacent to the second raised area.

2. The seal assembly of claim 1, further comprising a seal retainer removably secured to one of the bonnet and the bore to retain the seal assembly within the radial seal groove.

3. The seal assembly of claim 1, wherein the seal assembly comprises at least one of the group consisting of elastomers, synthetic rubber, and natural rubber.

4. The seal assembly of claim 1, wherein the seal assembly comprises multiple compounds.

5. The seal assembly of claim 1, wherein the seal assembly is a multi-durometer compound.

6. The seal assembly of claim 1, wherein the vent surface comprises a relief groove.

7. The seal assembly of claim 1, wherein the preload surface comprises a relief groove.

8. The seal assembly of claim 1, wherein the backup ring comprises one of a continuous ring, a segmented ring, and a rolled spring.

* * * * *